(12) United States Patent  
Aasgaard

(10) Patent No.: US 7,404,372 B2
(45) Date of Patent: Jul. 29, 2008

(54) EMERGENCY SIGNALING DEVICE

(75) Inventor: A. L. Pepper Aasgaard, Omaha, NE (US)

(73) Assignee: Abeo, LLC, Omaha, NE (US)

(*) Notice: Subject to any disclaimer, the term of this patent is extended or adjusted under 35 U.S.C. 154(b) by 0 days.

(21) Appl. No.: 11/261,934

(22) Filed: Oct. 28, 2005

(65) Prior Publication Data
US 2006/0162643 A1 Jul. 27, 2006

Related U.S. Application Data

(63) Continuation of application No. 10/718,177, filed on Nov. 20, 2003, now abandoned.

(60) Provisional application No. 60/428,048, filed on Nov. 20, 2002.

(51) Int. Cl.
B60Q 1/52 (2006.01)

(52) U.S. Cl. ............. 116/28 R; 116/63 R; 40/591; 340/471; 340/473

(58) Field of Classification Search ......... 116/28 R, 116/63 R, 63 P, 63 T, 173, 32, 202, 278, 306, 116/DIG. 16, DIG. 44; 40/591, 610, 588; 340/471, 472, 473, 908
See application file for complete search history.

(56) References Cited

U.S. PATENT DOCUMENTS

| 2,125,488 | A | | 8/1938 | Colie | |
|---|---|---|---|---|---|
| 3,255,725 | A | | 6/1966 | von Kreidner | |
| 3,430,374 | A | * | 3/1969 | Woodard | 40/591 |
| 3,594,938 | A | | 7/1971 | Mosch | |
| 3,763,585 | A | | 10/1973 | Mosch | |
| 4,044,482 | A | | 8/1977 | Mosch | |
| 4,607,444 | A | * | 8/1986 | Foster | 40/550 |
| 4,709,307 | A | * | 11/1987 | Branom | 362/103 |
| 4,821,668 | A | | 4/1989 | Leschke | |
| 5,010,319 | A | | 4/1991 | Killinger | |
| 5,076,196 | A | | 12/1991 | Chan | |
| 5,097,612 | A | * | 3/1992 | Williams | 40/591 |
| 5,103,205 | A | | 4/1992 | Halligan | |
| 5,224,439 | A | * | 7/1993 | O'Connell et al. | 116/201 |
| 5,245,943 | A | * | 9/1993 | Hull et al. | 116/202 |
| 5,398,437 | A | * | 3/1995 | Bump et al. | 40/582 |
| 5,424,924 | A | * | 6/1995 | Ewing et al. | 362/545 |
| 5,450,058 | A | | 9/1995 | Collier | |
| 5,636,462 | A | | 6/1997 | Kleiman | |
| 5,764,141 | A | * | 6/1998 | Chang | 340/472 |
| 5,905,434 | A | | 5/1999 | Steffan | |
| 6,027,227 | A | * | 2/2000 | Tung | 362/241 |
| 6,037,866 | A | | 3/2000 | Leibowitz | |

(Continued)

FOREIGN PATENT DOCUMENTS

CA 2 246 015 A1 5/2007

Primary Examiner—R. A. Smith
Assistant Examiner—Amy Cohen Johnson
(74) Attorney, Agent, or Firm—McKee, Voorhees & Sease, P.L.C.

(57) ABSTRACT

An emergency signaling device comprises a flexible substrate stowed in the trunk of a vehicle for extending from a folded position to an extended position, for conveying a message to motorists approaching the vehicle. The emergency signaling device may extend from the trunk of the vehicle upon activation of a remote trunk release when a hazard flasher system is on, or the like. The emergency signaling device may be removed from the vehicle for use as an emergency signaling device.

19 Claims, 4 Drawing Sheets

U.S. PATENT DOCUMENTS

| | | |
|---|---|---|
| 6,124,783 A | 9/2000 | Alexander |
| 6,138,394 A * | 10/2000 | Sulenski ............... 40/591 |
| 6,181,243 B1 | 1/2001 | Yang |
| 6,412,203 B1 | 7/2002 | Libhart |
| 6,448,902 B1 * | 9/2002 | Tung ............... 340/815.45 |
| 6,515,584 B2 * | 2/2003 | DeYoung ............... 340/475 |
| 6,520,669 B1 * | 2/2003 | Chen et al. ............... 362/545 |
| 6,538,567 B2 * | 3/2003 | Stewart ............... 340/475 |
| 2004/0062032 A1 * | 4/2004 | Mass ............... 362/84 |
| 2004/0128888 A1 * | 7/2004 | Payan et al. ............... 40/610 |
| 2005/0072350 A1 * | 4/2005 | Aasgaard ............... 116/259 |

* cited by examiner

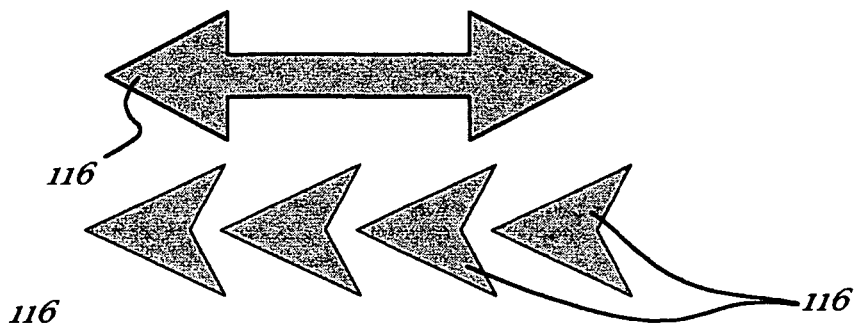
FIG. 8
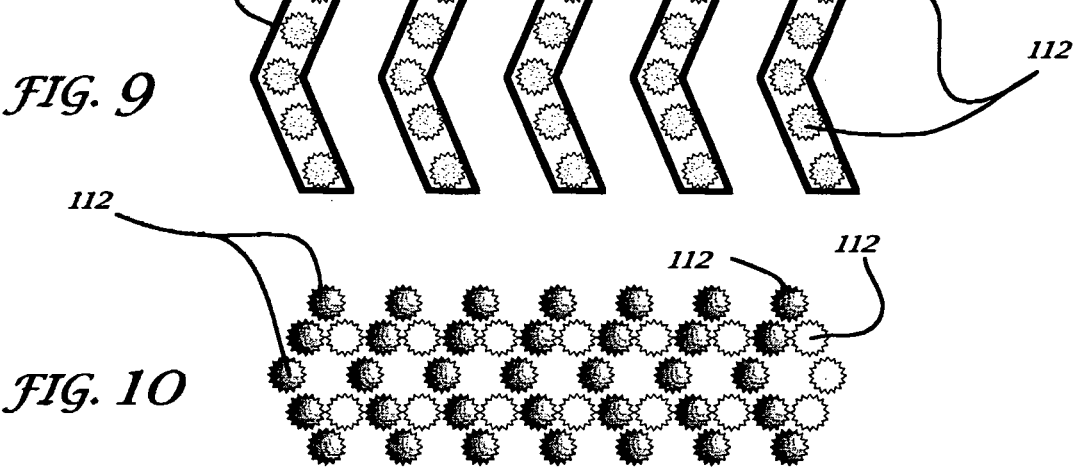
FIG. 9
FIG. 10
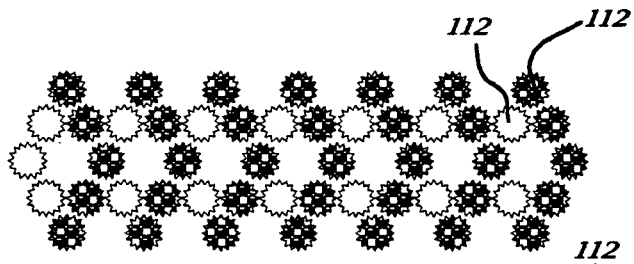
FIG. 11
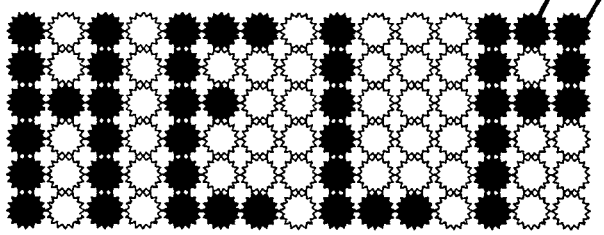
FIG. 12

EMERGENCY SIGNALING DEVICE

CROSS-REFERENCE TO RELATED APPLICATIONS

The present application is a continuation of U.S. patent application Ser. No. 10/718,177, filed Nov. 20, 2003 now abandoned, which claims the benefit under 35 U.S.C. § 119 (e) of U.S. Provisional Application Ser. No. 60/428,048 filed Nov. 20, 2002. U.S. patent application Ser. No. 10/718,177 and U.S. Provisional Application Ser. No. 60/428,048 are each herein incorporated by reference in their entirety.

FIELD OF THE INVENTION

The present invention generally relates to the field of roadside emergency warning devices and more particularly to an emergency signaling device capable of being mounted to a vehicle (e.g., capable of being mounted within the trunk of an automobile, or the like) for displaying indicia during emergency situations.

BACKGROUND OF THE INVENTION

A leading cause of serious automobile accidents are roadside emergencies (e.g., flat tires, mechanical failure, or the like) which cause a motorist to park his or her automobile along the side of a road where it may be struck by another automobile having an inattentive or distracted driver. Such accidents occur most likely during times when the driver of the oncoming automobile may be unable to see the parked vehicle or recognize that the vehicle is not moving, such as, at night when the driver may be drowsy, during periods of high traffic when the driver may be distracted by other automobiles on the road, or during poor visibility (e.g., rain, snow, fog, or the like) when the driver may be unable to discern that the parked automobile is not on the road and is not moving.

In addition to the hazard lights of the parked automobile, the motorist may employ emergency warning devices such as flares, triangular reflective markers, portable lights, or the like to warn other drivers of the possible danger. However, such warning devices are typically small and are placed near the ground making them difficult to see, especially when the drivers of oncoming automobiles are least likely to see them (e.g., at night, during periods of high traffic, or during periods of poor visibility). Moreover, such devices are usually only capable of warning oncoming motorists of a potential hazard and cannot direct the oncoming traffic around the hazard or provide messages to emergency personnel such as police, the fire department, or the like.

Consequently, it is desirable to provide an emergency signaling device capable of being mounted to a vehicle for displaying indicia during emergency situations. The emergency signaling device should be capable of warning oncoming motorists of a potential hazard and directing the motorists around the hazard. The emergency signaling device may further be capable of providing messages to emergency personnel such as police, the fire department, or the like.

SUMMARY OF THE INVENTION

Accordingly, the present invention is directed to an emergency signaling device suitable for being mounted to a vehicle for displaying indicia to oncoming motorists during emergency situations. The emergency signaling device is capable of warning oncoming motorists of a potential hazard and directing the motorists around the hazard. In exemplary embodiments, the emergency signaling device may further be capable of providing messages to emergency personnel such as police, the fire department, or the like.

In one specific embodiment of the invention, the emergency signaling device comprises a flexible substrate stowed in the trunk of a vehicle for extending from a folded position to an extended position, for conveying a message to motorists approaching the vehicle. The emergency signaling device may extend from the trunk of the vehicle upon activation of a remote trunk release when a hazard flasher system is on, or the like. The emergency signaling device may be removed from the vehicle for use as an emergency signaling device.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIGS. 8 through 12 are top plan views illustrating exemplary indicia that may be provided by the emergency signaling device of the present invention.

DETAILED DESCRIPTION OF THE INVENTION

Reference will now be made in detail to the presently preferred embodiments of the invention, examples of which are illustrated in the accompanying drawings.

Referring generally to FIGS. 1 through 12, emergency signaling devices in accordance with exemplary embodiments of the present invention are described. In exemplary embodiments of the present invention, the emergency signaling devices are constructed of highly reflective material and may employ light emitting assemblies, such as high intensity light emitting diode (LED) lights. The reflective material, the light emitting assemblies, or any combination thereof may be used to provide indicia, such as directional signals, messages, or the like, to ward off a collision with a vehicle, or the like. The emergency signaling device may also be used as a portable signaling device in emergencies. In accordance with exemplary embodiments of the present invention, the emergency signaling devices may be mounted on or in a vehicle, such as enclosed in the trunk of an automobile or the like. Alternately, the emergency signaling devices may be portable, capable of being carried or worn by a user. Preferably, the emergency signaling devices are capable of displaying indicia to direct traffic in emergency situations.

Figure 1:
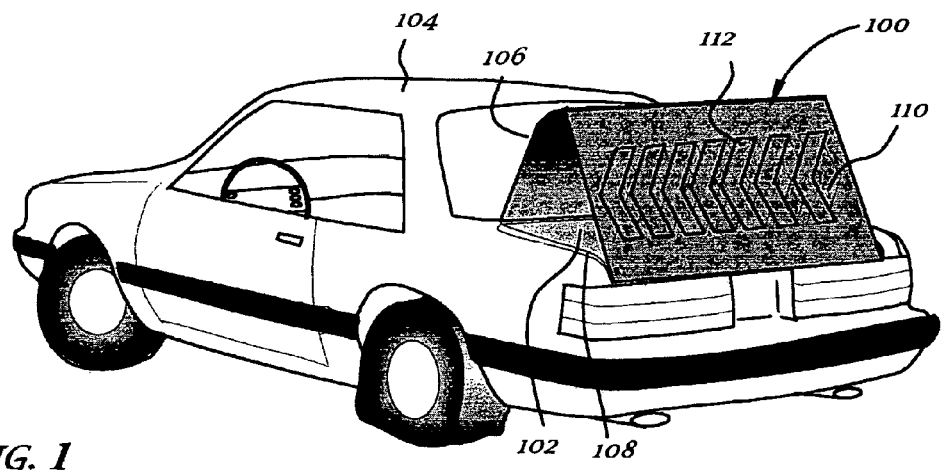
FIG. 1 is an isometric view illustrating an automobile employing an emergency signaling device in accordance with an exemplary embodiment of the present invention, wherein the emergency signaling device is extended.
Figure 2:
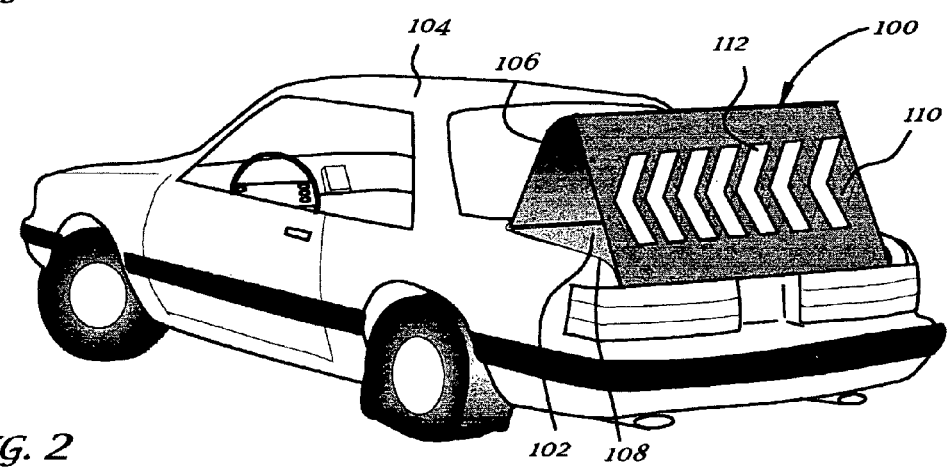
FIG. 2 is an isometric view of the automobile shown in FIG. 1, wherein indicia on the emergency signaling device are illuminated for directing oncoming traffic to the left of the automobile.
Figure 3:
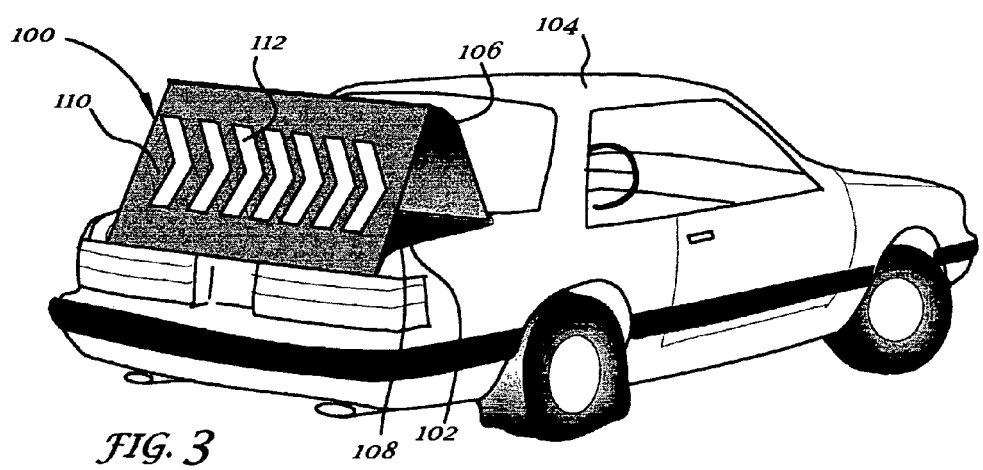
FIG. 3 is an isometric view of the automobile shown in FIG. 1, wherein indicia on the emergency signaling device are illuminated for directing oncoming traffic to the right of the automobile.
Figure 4:
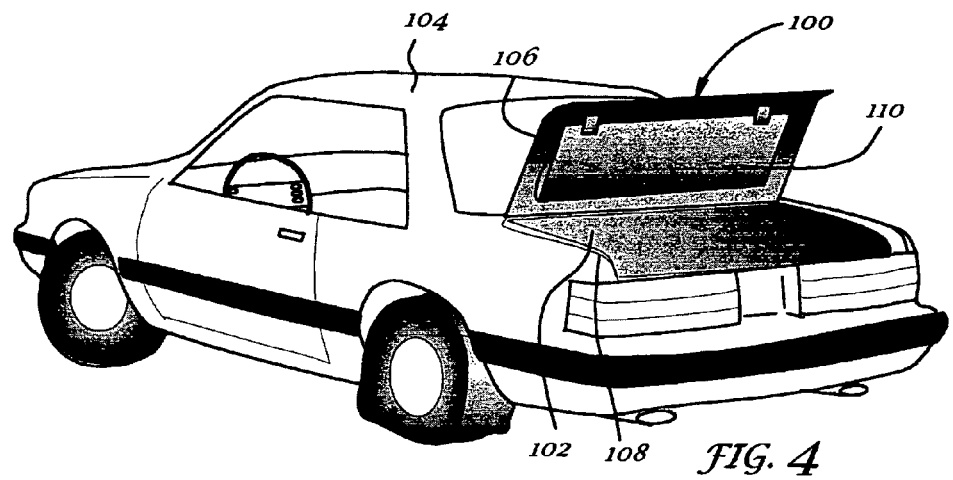
FIG. 4 is an isometric view of the automobile shown in FIG. 1, wherein the emergency signaling device is folded within the trunk of the automobile for storage.

Referring now to FIGS. 1 through 7, an emergency signaling device 100 in accordance with an exemplary embodiment of the present invention is described. In exemplary embodiments, the emergency signaling device 100 is located within the trunk 102 of a vehicle such as an automobile, a truck, a van, a sport-utility vehicle, or the like 104. For example, the emergency signaling device 100 may be attached to a trunk lid 106 of an automobile 104. The trunk lid 106 is hinged to move between a closed position for enclosing a trunk opening 108 and an opened position for providing access to the trunk 102 via the trunk opening 108. Preferably, the emergency signaling device 100 is constructed of a sturdy, lightweight material for being easily stowed in the trunk 102. For instance, the emergency signaling device 100 may be constructed from a substrate 110, easily folded and stored in the trunk 102 when not in use. For example, the substrate 110 may be easily extended from a folded position when the trunk lid 106 is in the closed position, as seen in FIG. 4, to an extended position when the trunk lid 106 is in the opened position, as seen in FIG. 1.

Figure 5:
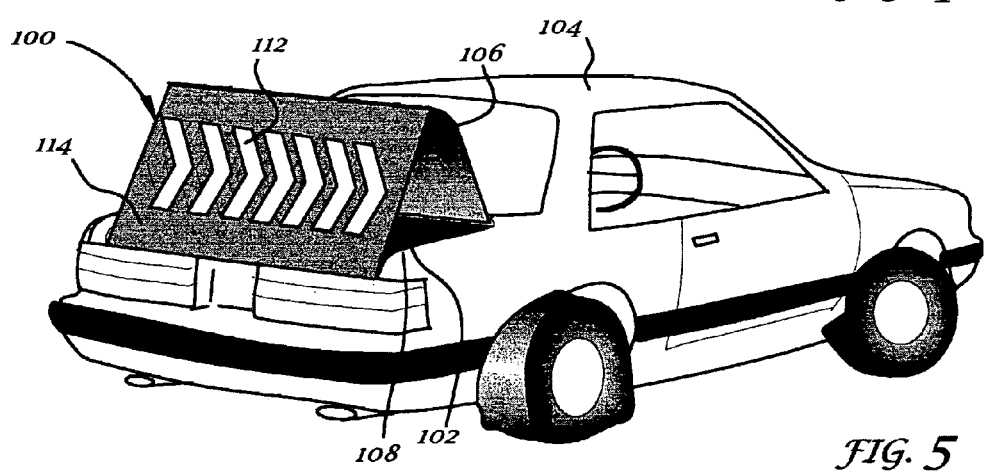
FIG. 5 is an isometric view illustrating an automobile employing an emergency signaling device in accordance with an exemplary embodiment of the present invention wherein the emergency signaling device employs a flexible substrate.
Figure 6:
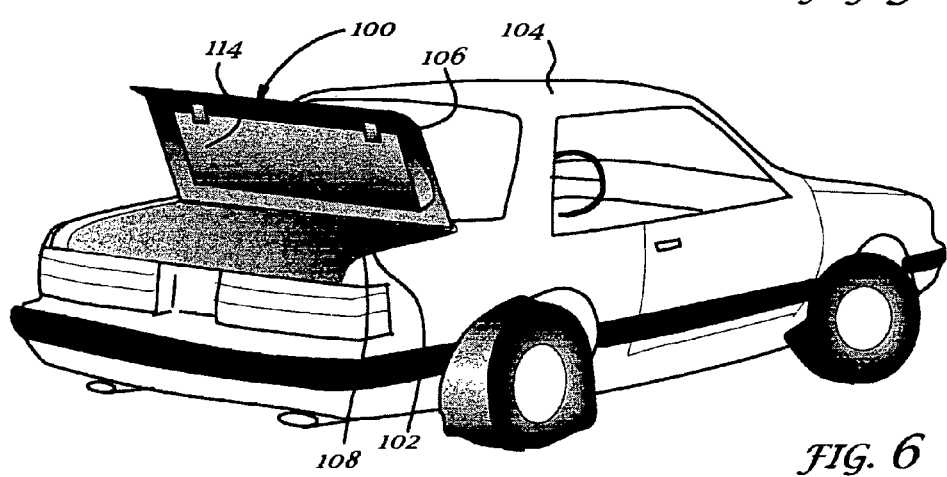
FIG. 6 is an isometric view of the automobile shown in FIG. 5, wherein the flexible substrate is folded for allowing the emergency signaling device to be stored within the trunk of the automobile.
Figure 7:
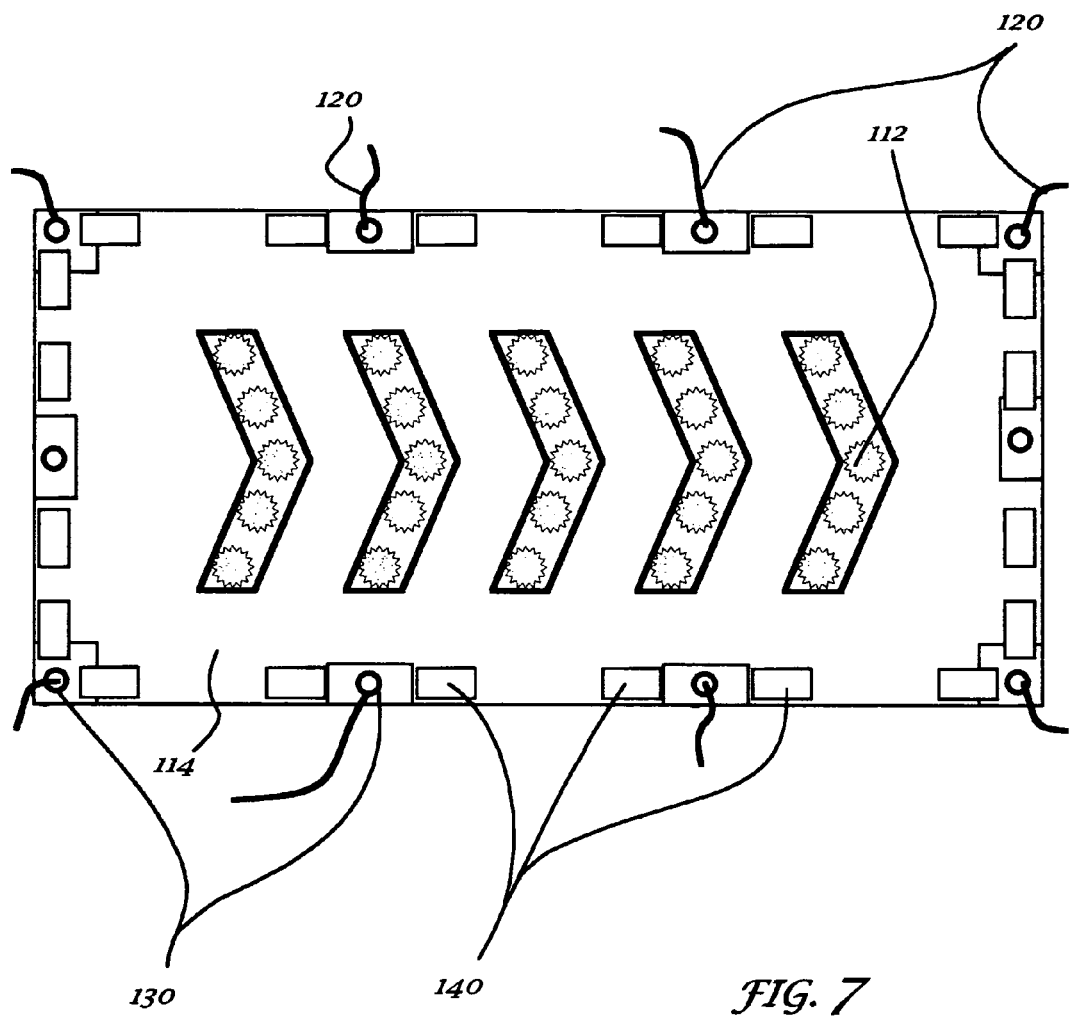
FIG. 7 is an top plan view illustrating the emergency signaling device shown in FIG. 5, wherein the emergency signaling device is detached from the trunk of the automobile.

Those of ordinary skill in the art will appreciate that the substrate 110 of the emergency signaling device 100 may be constructed of a reflective material or may include light emitting components such as LED lights or the like. For instance, in the embodiment shown in FIGS. 2 and 3, the substrate 110 includes a plurality of LED lights 112 sewn or woven into the substrate 110. Alternately, it is contemplated that the substrate 110 may include reflective material portions such as reflective tape, reflective cloth, or the like. In exemplary embodiments of the present invention, the substrate 110 may comprise a flexible substrate 114 for being more easily folded and/or removed from the trunk lid 106, as seen in FIGS. 5 through 7. In such embodiments, as illustrated in FIG. 7, the flexible substrate 110 may be provided with one or more cords, bungee cords, ropes, strips of hook and loop fastener material (e.g., VELCRO, etc.), or the like, which may extend through eyelets 130 provided at corners and/or along the perimeter of the substrate 110 for facilitating attachment of the emergency signaling device 100 to another object, such as wrecked vehicle, a boat, an airplane, a wall, a bridge or overpass column, an injured person, or the like. Additionally, or alternatively, one or more magnets 140 may be provided along the perimeter of the substrate 110 for facilitating attachment of the emergency signaling device 100 to metallic objects (e.g., a wrecked vehicle, an emergency vehicle, or the like).

In accordance with exemplary embodiments of the present invention, the emergency signaling device 100 stored in the trunk 102 of the automobile 104 may be used to alert oncoming vehicles of a potential hazard, such as if the automobile 102 is pulled off to the side of a road or the like. It is understood that the emergency signaling device 100 may be deployed from the trunk 102 of the automobile 104 in a variety of different ways. For example, the emergency signaling device 100 may be extended from the folded position to the extended position upon activation of a trunk release, such as a remote trunk release (not shown). The remote trunk release is for moving the trunk lid 106 from the closed position to the opened position. Such remote trunk releases may be commonly found in a cab of the automobile 104 or the like.

In exemplary embodiments of the present invention, the emergency signaling device 100 is securely stored within the trunk 102 of the automobile 104 during normal operation of the automobile 104. For instance, the emergency signaling device 100 may include fasteners for securely fastening the substrate 110 to the trunk lid 106. Preferably, upon normal activation of the remote trunk release, the emergency signaling device 100 remains securely fastened to the trunk lid 106. However, upon activation of the remote trunk release while a hazard flasher system is turned on, the emergency signaling device may be extended from the folded position to the unfolded position upon moving of the trunk lid 106 from the closed position to the opened position. Those of ordinary skill in the art will appreciate that the hazard flasher system may include components such as a hazard light activation switch, an electronic warning circuit, or the like, the hazard flasher system being activated by a user, activated by a remote sensing system such as a vehicle electronic circuit, or the like, for flashing lights of the automobile 104. It is also contemplated that a manual latch release assembly may be included proximally to the trunk 102 of the automobile 104 for allowing a user to selectively deploy the emergency signaling system 100 when manually unlatching the trunk lid 106.

The emergency signaling device 100 may be at least partially released from the trunk lid 106 into the extended position in a variety of ways. For example, activation of the remote trunk release may cause the emergency signaling device 100 to be dropped down, pulled up, unfolded, or the like. It is contemplated that the emergency signaling device 100 may also be stowed at the base of the trunk 102, being attachable via the fasteners to the trunk lid 106 for being extended from the folded position to the extended position. In exemplary embodiments of the present invention, the emergency signaling device 100 may be fully detached from the trunk lid 106 for use as a portable emergency signaling device, such as for use at a location remote from the automobile.

Those of ordinary skill in the art will appreciate that the emergency lighting device 100 may be powered in a variety of different ways. For instance, the LED lights 112 may be powered by a vehicle's electrical system, being coupled with a battery of the automobile 104 or the like. Alternately, the emergency lighting device 100 may be powered by a power supply, such as a portable battery or the like. The power supply may be stowed in the trunk 102 of the car 104. It is contemplated that the use of a portable battery may be preferable for making the emergency signaling device 100 portable when removed from the trunk 102 of the automobile 104. Alternately, a light source may be placed in or near the trunk 102 for illuminating a reflective material portion of the emergency signaling device 100. For instance, a light may be placed on the trunk lid 106, near the trunk opening 108, or the like, for illuminating the reflective material portion of the emergency signaling device 100. Such a configuration may have the added advantage of being part of existing vehicle configurations and/or being useful for lighting the interior of the trunk 102 during normal use of the automobile 104. It should be noted that the power supply, such as the portable battery, may be charged in a variety of ways, including being coupled with the vehicle's electrical system when stowed in the trunk 102 of the car 104, being removable for being coupled with a household circuit, or the like.

In exemplary embodiments, use of an emergency signaling device 100 is not necessarily limited to a vehicle, such as the automobile 104. When used as a portable emergency signaling device, the emergency signaling device 100 may serve a variety of different safety functions. For example, an injured person located on the side of the road may be wrapped in an emergency signaling device 100 to avoid being hit by a passing automobile. Alternately, a person stranded in a remote area may use the emergency signaling device as a beacon for alerting passing aerial rescue vehicles of his or her location. In yet another exemplary use, an emergency signaling device may be used on maritime craft for providing signals to other craft and/or emergency vehicles. In a still further exemplary use, an emergency signaling device may be removed from one vehicle and draped over or attached to another vehicle (e.g. via cords, rope, bungee cords, or the like 120 extending through eyelets 130 or via magnets 140) for alerting others to its presence on the side of the road or the like. Those of ordinary skill in the art will appreciate that the emergency signaling device 100 may be used for a variety of different purposes without departing from the scope and spirit of the present invention.

Referring now to FIGS. 8 through 12, different indicia configurations for an emergency signaling device 100 are shown in accordance with exemplary embodiments of the present invention. The indicia configurations are for conveying a message when the substrate 110 is unfolded to the extended position. Preferably, the indicia are positioned so as to be generally visible to motorists approaching the automobile. The emergency signaling device 100 may include reflective material portions 116, LED light configurations 112, or the like, in various shapes and sizes. For example, as shown in FIGS. 8 through 11, an emergency signaling device 100 may include reflective portions 116 or LED lights 112 in the shape of arrows, such as arrow shapes commonly used to indicate a vehicle should move to one side of the road. It is contemplated that different indicia may be placed on either side of the emergency signaling device 100. For example, one side may include automobile directing indicia as shown in FIGS. 8 through 11, while another side may include a request for help, as shown in FIG. 12. Those of ordinary skill in the art will appreciate that reflective material portions 116 may be used in combination with LED light configurations 112 or the like, as seen in FIG. 9, without departing from the scope and intent of the present invention. It is further contemplated that a variety of different signaling indicia may be included with an emergency signaling device 100 without departing from the scope and spirit of the present invention. For example, the emergency signaling device 100 may comprise a roll of material, having many different signaling indicia, and a user may be able to roll, unroll, or shape the material for displaying the desired indicia. For instance, an emergency signaling device 100 may include directional traffic indicia, a help symbol, the word "help" or the like. It should be noted that the word "help" may also be printed in several languages, such as Spanish, English, or the like.

LED lights 112 may also be used for creating varying shapes and patterns by electrically controlling active lights in a matrix composed of individual lights over time. It is contemplated that a variety of different static indicia, moving indicia, animation or the like may be provided for indicating an emergency state or directional indication to an observer of the emergency signaling device 100. For example, as shown in FIGS. 10 and 11, the emergency signaling device 100 may activate LED lights 112 to produce a set of directional traffic arrows. Those of ordinary skill in the art will appreciate that such directional traffic arrows may also be animated by an LED controller (not shown) to appear to move animatedly in a certain direction. For instance, directional traffic arrows may appear to move (scroll) in the direction pointed by the arrows. Alternately, the LED lights 112 may scroll, flash, or animate words or phrases, such as "help" or the like. A message may also be scrolled or flashed across the emergency signaling device 100, such as "slow down," "move right," or the like. It is contemplated that a variety of different indicia, words, phrases, slogans, or the like may be displayed by the emergency signaling device 100 without departing from the scope and intent of the present invention.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An emergency signaling device adapted to deploy from a trunk of a vehicle having a pre-existing trunk release and hazard light activation switch to alert oncoming traffic, the emergency signaling device comprising:
   a flexible substrate foldable between at least a folded position and an unfolded position wherein the flexible substrate is stowed in the folded position and biased toward the unfolded position, the flexible substrate has a back surface and a front surface of non-reflective material having a reflective material layer coupled thereto in a pattern;
   a plurality of fasteners in the flexible substrate for facilitating attachment of the emergency signaling device to the trunk so that the front surface faces rearward so as to be visible to oncoming traffic;
   a plurality of lights disposed within the reflective material layer, the plurality of lights illuminated to form indicia for displaying a message, the reflective material layer to collect and reflect light from approaching traffic and the plurality of lights to alert approaching traffic of the vehicle, and the plurality of lights being light emitting diodes;
   the flexible substrate stowed in the trunk of the vehicle in the folded position and deployed from the trunk to the unfolded position to display the message to alert approaching traffic and direct traffic away from the vehicle; and
   the flexible substrate is automatically and simultaneously released from the folded to the unfolded position upon sequenced activation of the vehicle's hazard light activation switch and trunk release.

2. The emergency signaling device as claimed in claim 1, further comprising a power supply for providing electrical power to the light emitting diode.

3. The emergency signaling device as claimed in claim 2, wherein the power supply comprises:
   a. a battery coupled to the substrate; or
   b. a plug-in outlet associated with a household electrical circuit.

4. The emergency signaling device as claimed in claim 3, wherein the battery is charged:
   a. by the vehicle's battery when the flexible substrate is in the trunk; or b. by the plug-in outlet when used at locations remote from the vehicle.

5. The emergency signaling device as claimed in claim 1, wherein the plurality of fasteners comprise magnetic fasteners adapted to secure the flexible substrate to the trunk in the folded and unfolded position.

6. The emergency signaling device as claimed in claim 1, wherein the flexible substrate is attached in the trunk of the vehicle and is removable from the trunk for use at a location remote from the vehicle.

7. The emergency signaling device as claimed in claim 1, wherein the trunk comprises a trunk lid, and wherein the flexible substrate is fastened within the trunk to the trunk lid by the plurality of fasteners and adapted to simultaneously and automatically deploy from the folded to the unfolded position when the vehicle's hazard light activation switch is on and the trunk release comprising a remote trunk release associated with the vehicle is activated.

8. The emergency signaling device as claimed in claim 7, further comprising a power supply for powering the plurality of lights, wherein the power supply is charged from a battery of the vehicle when the flexible substrate is in the folded position.

9. The portable emergency signaling device as claimed in claim 1 further comprising a light emitting diode controller, wherein the plurality of lights are arranged in the form of at least one arrow animated by the light emitting diode controller for displaying an animated warning for directing an oncoming automobile away from the vehicle.

10. The emergency signaling device of claim 8 wherein the flexible substrate upon deployment automatically self-attaches to the trunk to alert approaching traffic and support the trunk lid in an open position.

11. An emergency signaling device adapted to deploy from a trunk lid of a trunk of a vehicle and to operate in concert with a hazard flashing system and a trunk release of the vehicle, the emergency signaling device comprising:
   a flexible substrate electrically connected to the vehicle and attached within the trunk to the trunk lid;
   the flexible substrate automatically and simultaneously upon activation of the hazard flashing system and the trunk release within the vehicle self-deploys from a folded position to an unfolded position;
   a plurality of fasteners disposed in the flexible substrate to attach the emergency signaling device to the trunk lid;
   a plurality of lights disposed within a reflective material layer coupled to the flexible substrate to form a pattern; and
   the plurality of lights illuminated by actuation of the hazard flashing system to form indicia to display a message to warn approaching traffic.

12. The emergency signaling device of claim 11 wherein the flexible substrate automatically and simultaneously upon activation of the hazard flashing system and a remote trunk release self-deploys from the folded position to the unfolded position and the plurality of lights illuminate.

13. The emergency signaling device of claim 12 wherein the plurality of lights are adapted to shutoff upon deactivation of the hazard flashing system of the vehicle.

14. The emergency signaling device of claim 13 wherein the flexible substrate upon deployment automatically self-attaches to the trunk to be visually ascertainable by approaching traffic and support the trunk lid in an open position.

15. The emergency signaling device of claim 11 wherein a battery for powering the plurality of lights is chargeable by:
   a. a battery of the vehicle; or
   b. a plug-in outlet associated with a household electrical circuit.

16. The emergency signaling device of claim 15 wherein the flexible substrate is adapted to detach from the trunk lid for use as a portable device and charging in the plug-in outlet.

17. An emergency signaling device adapted to deploy from a trunk lid of a trunk of a vehicle when open and to operate in concert with a hazard flashing system of the vehicle, the emergency signaling device comprising:
   a flexible substrate electrically connected to the vehicle and attached within the trunk to the trunk lid in a stowed position;
   a plurality of lights disposed within a reflective material layer coupled to the flexible substrate to form a pattern; and
   the plurality of lights illuminated to form indicia to display a message and the flexible substrate automatically and simultaneously upon activation of the hazard flashing system within the vehicle self-deploys from the stowed position to an unfolded position.

18. The emergency signaling device of claim 17 wherein the reflective material layer is illuminated by light from a lamp on the trunk lid directed toward the flexible substrate when the trunk lid is open.

19. The emergency signaling device of claim 17 wherein operation of turn signal controls in the vehicle illuminate left and right arrows displayed on the flexible substrate to direct oncoming traffic left or right away from the vehicle.

* * * * *